United States Patent Office 3,158,617
Patented Nov. 24, 1964

3,158,617
C-NORMORPHINAN DERIVATIVES AND PRODUCTION THEREOF
Yoshiro Sawa, Hyogo Prefecture, and Naoki Tsuzi, Osaka Prefecture, Japan, assignors to Shionogi & Co., Ltd., Osaka, Japan
No Drawing. Filed Apr. 3, 1963, Ser. No. 270,188
Claims priority, application Japan Apr. 6, 1962
19 Claims. (Cl. 260—294)

The present invention relates to C-normorphinan derivatives and production thereof.

In the term "morphinan" herein employed, there are included all the compounds having a fundamental structure representable by the following plane formula:

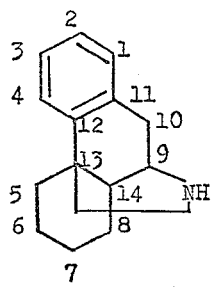

Accordingly, the term "morphinan" means not only normal morphinan (cis-1,3,4,9,10,10a-hexahydro-2H-10,4a-iminoethanophenanthrene) but also isomorphinan (trans-1,3,4,9,10,10a-hexahydro-2H-10,4a - iminoethanophenanthrene), inclusively. When distinction is necessary, normal morphinan and iso morphinan will be hereinafter designated as "morphinan (cis)" and "morphinan (trans)," respectively. In addition, the position-numbering hereinafter employed for the morphinan derivatives is that generally accepted in morphinan chemistry as shown in the above plane formula.

The objective C-normorphinan derivative in the present invention is representable by the following plane formula:

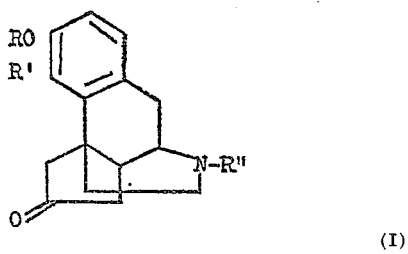

(I)

wherein R represents a lower alkyl group (e.g., methyl, ethyl, propyl, butyl), R' represents a hydrogen atom, an aryloxy group (e.g., phenyloxy, naphthyloxy) or a substituted aryloxy group (e.g., substituted phenyloxy, substituted naphthyloxy) wherein the substituent is lower alkyl (e.g., methyl, ethyl, prophyl, butyl), lower alkoxy (e.g., methoxy, ethoxy, propoxy, butoxy), nitro or amino and R" represents a hydrogen atom, a lower alkyl group (e.g., methyl, ethyl, propyl, butyl) or an ar(lower)-alkyl group (e.g., benzyl, phenethyl) and shows pharmacological activity such as analgesic activity and antiinflammatory activity.

Accordingly, a basic object of the present invention is to embody the C-normorphinan derivative of Formula I. Another object of the invention is to embody the pharmacologically active C-normorphinan (I). A further object of the invention is to embody a process for preparing the C-normorphinan (I). These and other objects will be apparent to those conversant with the art to which the present invention pertains from the subsequent description.

The process of the present invention is illustratively represented by the following scheme:

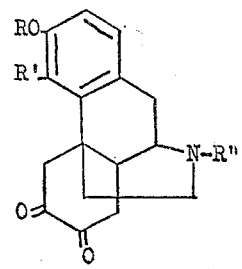

(II)

↓

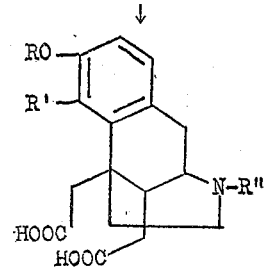

(III)

↓

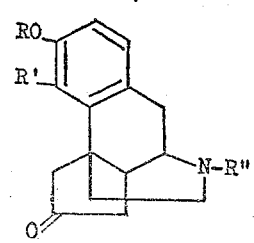

(I)

wherein R, R' and R" each has the same significance as designated above.

As the starting material, there may be used the optically active or racemic 6,7-dioxomorphinan (II). The 6,7-dioxomorphinan (II) can be prepared according to a conventional manner [Sawa et al.: Tetrahedron, vol. 15, p. 144 (1961)].

According to the process of the present invention, the starting 6,7-dioxomorphinan (II) is subjected to oxidation, followed by cyclization of the resultant 6,7-secomorphinan (III) to the objective C-normorphinan (I). The oxidation can be accomplished by treating the 6,7-dioxomorphinan (II) with an oxidizing agent such as hydrogen peroxide in an inert organic solvent medium (e.g., methanol, ethanol, propanol, acetic acid, propionic acid, acetone, ether, tetrahydrofuran, dioxane, benzene, toluene, xylene, chloroform, dichloromethane, carbon tetrachloride). Although the reaction may proceed at room temperature (15 to 30° C.), heating so as to reflux is preferred. Usually, the reaction may be completed in from about 2 hours to about 8 hours, the lower temperature requiring the longer reaction time. The subsequent cyclization can be effected by treating the resulting 6,7-secomorphinan (III) with a dehydrating agent such as acid anhydride, preferably lower alkanoic anhydride (e.g., acetic anhydride, propionic anhydride), while heating usually with reflux. As the dehydrating agent per se serves as a reaction medium, no other solvent is needed. Preferably, the fresh dehydrating agent may be added to or substituted for the primarily employed agent in the course of the reaction whereby the high dehydrating activity of the agent is maintained during the reaction.

The objective C-normorphinan (I) occurs in optically active form as well as in racemic mixture and these are all within the scope of the present invention.

The C-normorphinan (I) forms acid addition salts with organic and inorganic acids. Illustrative acid addition salts include the hydrohalide (e.g., hydrochloride, hydrobromide, hydroiodide), sulfate, phosphate, nitrate, tartrate, salicylate, benzoate, malate, citrate, acetate, etc.

The thus-produced C-normorphinan (I) and acid addition salts thereof exhibit pharmacological activity such as analgesic activity and antiinflammatory activity. For instance, in the analgesic activity test using mice according to the Haffner-Hesse method [Hesse: Arch. exp. Path. u. Pharm., vol 158, p. 233 (1930)], the $ED_{50}$ (effective dose) of (—) - 3 - methoxy-6-oxo-N-methyl-C-normorphinan (cis) hydrochloride was 9.2 milligrams per kilogram of body weight. Further, for instance, (+)-3-methoxy-6-oxo-N-methyl-C-normorphinan (cis) hydrochloride produced inhibition of the edema caused by formalin at the inhibitory ratio of 32.4 percent, when administered subcutaneously to rats at the dose of 50 milligrams per kilogram of body weight. Accordingly, they are useful as analgesic and/or antiinflammatory agents.

Practical and presently preferred embodiments of the present invention are illustrated by the following examples. In the examples, abbreviations each have conventional meanings, e.g., mg.=milligram(s), g.=gram(s), ml.=millilitre(s), ° C.=degrees centigrade.

EXAMPLE 1

Preparation of (+)-3-Methoxy-4-Phenyloxy-6-Oxo-N-Methyl-C-Normorphinan (Cis)

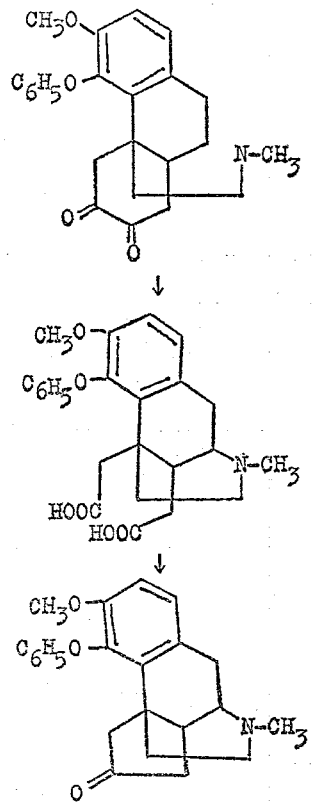

To a solution of (—)-3-methoxy-4-phenyloxy-6,7-dioxo-N-methylmorphinan (cis) [Sawa et al.: Tetrahedron, vol. 15, p. 144 (1961)] (46.9 g.) in glacial acetic acid (35 ml.), there is dropwise added 30% hydrogen peroxide (16 ml.) in about 15 minutes, and the resultant mixture is heated on a water bath for 6 hours. After removal of acetic acid under reduced pressure, the residue is treated with methanol (100 ml.). The crystallized substance is collected by filtration and washed with methanol to give pale yellowish brown crystals (34.8 g.). The crystals are suspended in methanol (170 ml.), dissolved by the addition of 28% ammonia-water (12 ml.) and filtered. The filtrate is neutralized with acetic acid and allowed to stand at room temperature (15 to 30° C.). The precipitated crystals are collected by filtration to give 3-methoxy-4-phenyloxy - N - methyl-6,7-secomorphinan-6,7-dioic acid (cis) (33.4 g.) as crystals melting at 266 to 267° C. (decomp.).

Analysis.—Calcd. for $C_{24}H_{27}O_6N \cdot \frac{1}{2}CH_3OH$: C, 66.65; H, 6.62; N, 3.17. Found: C, 66.68; H, 6.94; N, 3.28.

A solution of 3-methoxy-4-phenyloxy-N-methyl-6,7-secomorphinan-6,7-dioic acid (cis) (25.2 g.) above prepared in acetic anhydride (100 ml.) is heated for 1 hour at 130° C. After removal of acetic anhydride under reduced pressure, there is newly added acetic anhydride (100 ml.). The resulting mixture is heated for 2.5 hours at 145° C. After removal of acetic anhydride under reduced pressure, the residue is dissolved in benzene. The benzene solution is shaken with dilute hydrochloric acid. The hydrochloric acid layer is adjusted to alkalinity with aqueous sodium carbonate and shaken with benzene. The dark reddish benzene layer is chromatographed on alumina to eliminate impurities. The resulting benzene solution is evaporated to give yellowish brown crystals (11.8 g.). The crystals are mixed with hydrochloric acid and water removed. The residue is washed with acetone and crystallized from ethanol to give (+)-3-methoxy-4-phenyloxy-6-oxo-N-methyl-C-normorphinan (cis) hydrochloride (11.6 g.) as crystals melting at 275 to 276° C. (decomp.).

Analysis.—Calcd. for $C_{23}H_{25}O_3N \cdot HCl$: C, 69.08; H, 6.55; N, 3.50. Found: C, 68.68; H, 6.88; N, 3.31.

The hydrochloride is treated with an alkali and crystallized from ether to give (+)-3-methoxy-4-phenyloxy-6-oxo-N-methyl-C-normorphinan (cis) as crystals melting at 147.5 to 149° C. $[\alpha]_D^{28}$ +130.0° (ethanol).

Analysis.—Calcd. for $C_{23}H_{25}O_3N$: C, 76.00; H, 6.93; N, 3.85. Found: C, 76.35; H, 7.04; N, 4.09.

EXAMPLE 2

Preparation of (+)-3-Methoxy-6-Oxo-N-Methyl-C-Normorphinan (Cis)

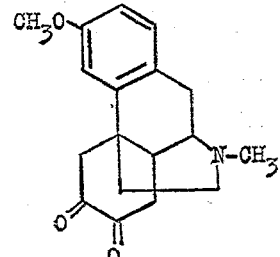

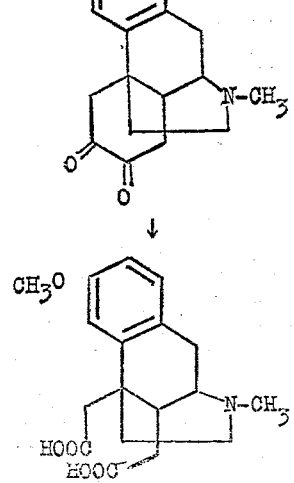

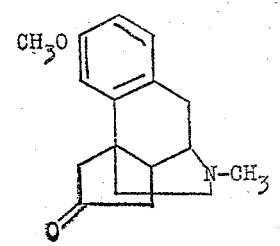

To a solution of (+)-3-methoxy-6,7-dioxo-N-methyl-morphinan (cis) [Sawa et al.: Tetrahedron, vol. 15, p. 144 (1961)] (18.5 g.) in glacial acetic acid (93 ml.), there is added 30% hydrogen peroxide (6.5 ml.), and the resultant mixture is heated on a water bath for 6 hours. The reaction mixture is treated as in Example 1 whereby (+)-3-methoxy-N-methyl-6,7-secomorphinan-6,7-dioic acid (cis) (16.0 g.) is obtained as crystals melting at 280° C. (decomp.). $[\alpha]_D^{26.5°}$ +8.4° (N hydrochloric acid).

Analysis.—Calcd. for $C_{18}H_{23}O_5N$: C, 64.85; H, 6.95; N, 4.20. Found: C, 64.65; H, 6.99; N, 4.30.

A solution of (+)-3-methoxy-N-methyl-6,7-secomorphinan-6,7-dioicacid (cis) (8.6 g.) above prepared in acetic anhydride (34.5 ml.) is heated for 2 hours at 130° C. After removal of acetic anhydride under reduced pressure, there is newly added acetic anhydride (34.5 ml.). The resulting mixture is heated for 3.5 hours at 140° C. After removal of acetic anhydride under reduced pressure, the residue is dissolved in benzene. The benzene solution is shaken with dilute hydrochloric acid. The hydrochloric acid layer is adjusted to alkalinity with aqueous sodium carbonate and shaken with benzene. The benzene layer is chromatographed on alumina to eliminate impurities. The resulting benzene solution is evaporated to give (+)-3-methoxy-6-oxo-N-methyl-C-normorphinan (cis) (6.44 g.) as an oil.

The oil is treated with hydrochloric acid and crystallized from water to give (+)-3-methoxy-6-oxo-N-methyl-C-normorphinan (cis) hydrochloride as crystals melting at 257.5 to 258.5° C. (decomp.). $[\alpha]_D^{26}$ +151.6±2° (water).

Analysis.—Calcd. for $C_{17}H_{21}O_2N \cdot HCl \cdot 2H_2O$: C, 59.38; H, 7.62; N, 4.07. Found: C, 59.75; H, 7.68; N, 3.94.

EXAMPLE 3
*Preparation of (−)-3-Methoxy-6-Oxo-N-Methyl-Normorphinan (Cis)*

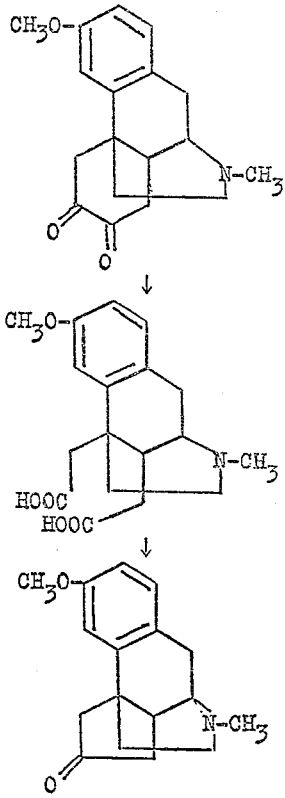

To a solution of (−)-3-methoxy-6,7-dioxo-N-methyl-morphinan (cis) (19.2 g.) in glacial acetic acid (96 ml.), there is added 30% hydrogen peroxide (6.7 ml.), and the resultant mixture is heated on a water bath for 6 hours. The reaction mixture is treated as in Example 1 whereby (−)-3-methoxy-N-methyl-6,7-secomorphinan-6,7-dioic acid (cis) (15.1 g.) is obtained as crystals melting at 275 to 277° C. (decomp.). $[\alpha]_D^{26.5}$ −8.4±2° (N-hydrochloric acid).

Analysis.—Calcd. for $C_{18}H_{23}O_5N$: C, 64.85; H, 6.95; N, 4.20. Found: C, 64.81; H, 7.08; N, 4.26.

A solution of (−)-3-methoxy-N-methyl-6,7-secomorphinan-6,7-dioic acid (cis) (13.2 g.) above prepared in acetic anhydride (53 ml.) is heated for 2 hours on an oil bath at 130° C. After removal of acetic anhydride under reduced pressure, there is newly added acetic anhydride (53 ml.). The resulting mixture is heated for 3.5 hours at 140° C. After removal of acetic anhydride under reduced pressure, the residue is dissolved in water. The resultant solution is acidified with hydrochloric acid and treated with decolorizing carbon. The filtrate is adjusted to alkalinity with ammonia-water and shaken with benzene. The benzene layer is chromatographed on alumina to eliminate impurities. The resulting benzene solution is evaporated to give a yellow oil, which is dissolved in dilute hydrochloric acid, condensed under reduced pressure, washed with acetone and crystallized from ethanol to give (−)-3-methoxy-6-oxo-N-methyl-C-normorphinan (cis) hydrochloride (6.4 g.) as crystals melting at 259 to 260° C. (decomp.). $[\alpha]_D^{26.5}$ −148.4±2° (water).

Analysis.—Calcd. for $C_{17}H_{21}O_2N \cdot HCl \cdot 2H_2O$: C, 59.37; H, 7.62; N, 4.07; Cl, 10.31. Found: C, 59.81; H, 7.59; N, 4.29; Cl, 10.97.

The hydrochloride is treated with an alkali and crystallized from ether to give (−)-3-methoxy-6-oxo-N-methyl-C-normorphinan (cis) as crystals melting at 96 to 97° C. $[\alpha]_D^{26.5}$ −221.0±2° (ethanol).

The starting material of this example, (−)-3-methoxy-6,7-dioxo-N-methylmorphinan (cis), is prepared from (−)-3-methoxy-4-hydroxy-6,7-dioxo-N-methylmorphinan (cis) [Goto et al.: Proc. Japan Academ., vol. 34, p. 619 (1958)] according to the following scheme:

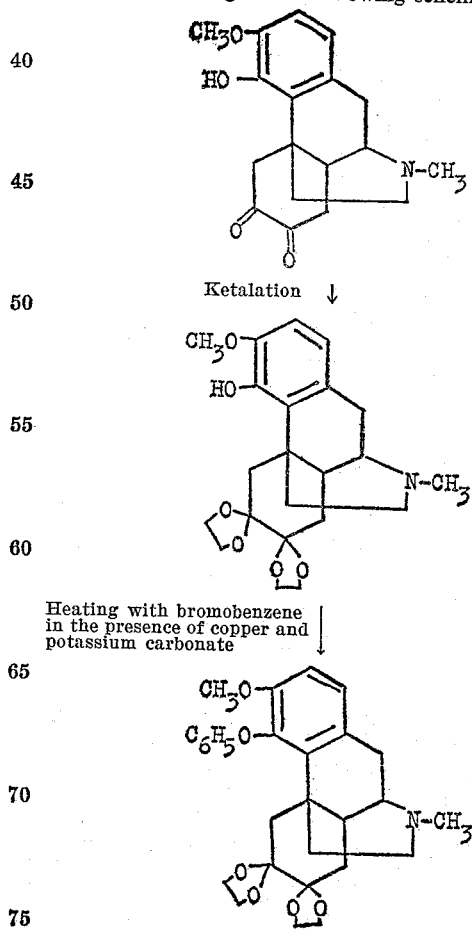

(1) Treatment with metallic sodium in liquid ammonia
(2) Decomposition with water

↓

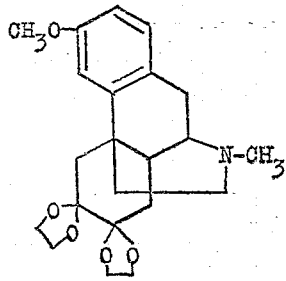

Deketalation ↓

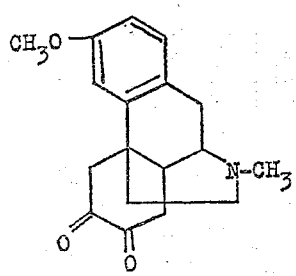

EXAMPLE 4

*Preparation of (—)-3-Methoxy-4-Phenyloxy-6-Oxo-N-Methyl-C-Normorphinan (Cis)*

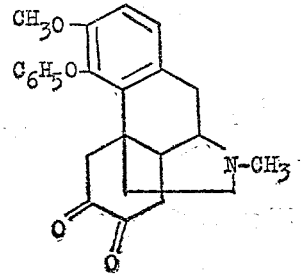

↓

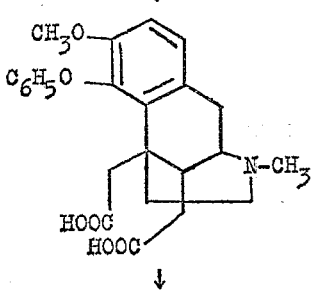

↓

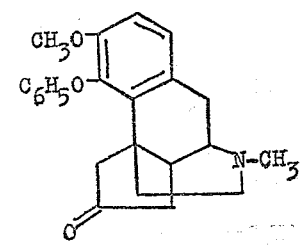

To a solution of (—)-3-methoxy-4-phenyloxy-6,7-dioxo-N-methylmorphinan (cis) (15.0 g.) in glacial acetic acid (75 ml.), there is added 30% hydrogen peroxide (53 ml.), and the resultant mixture is heated on a water bath for 6 hours. The reaction mixture is treated as in Example 1 whereby (—) - 3 - methoxy - 4 - phenyloxy-N-methyl-6,7-secomorphinan-6,7-dioic acid (cis) (12.2 g.) is obtained as crystals melting at 262 to 263° C.

A solution of (—)-3-methoxy-4-phenyloxy-N-methyl-6,7-secomorphinan-6,7-dioic acid (cis) (11.4 g.) above prepared in acetic anhydride (46 ml.) is heated for 2 hours on an oil bath at 130° C. After removal of acetic anhydride under reduced pressure, there is newly added acetic anhydride (46 ml.). The resulting mixture is heated for 3 hours at 140° C. The reaction mixture is allowed to stand at room temperature (15 to 30° C.) overnight. The precipitated crystals are collected by filtration, washed with water, adjusted to alkalinity with sodium carbonate and shaken with benzene. The benzene extract is evaporated and crystallized from methanol to give (—)-3-methoxy-4-phenyloxy-6-oxo-N-methyl-C-normorphinan (cis) (7.9 g.) as crystals melting at 149 to 149.5° C. $[\alpha]_D^{22.5}$ —128.6±2° (ethanol).

*Analysis.*—Calcd. for $C_{23}H_{25}O_3N$: C, 76.00; H, 6.93; N, 3.85. Found: C, 76.07; H, 7.05; N, 3.83.

The hydrochloride: M.P., 273 to 273.5° C. (crystallized from ethanol). $[\alpha]_D^{24}$ —110.1±2° (water).

The starting material of this example, (—)-3-methoxy-4-phenyloxy-6,7-dioxo-N-methylmorphinan (cis), is prepared from (—)-3-methoxy-4-phenyloxy-6,6,7,7-diethylenedioxy-N-methylmorphinan (cis) [cf. Example 3 of this specification] according to the following scheme:

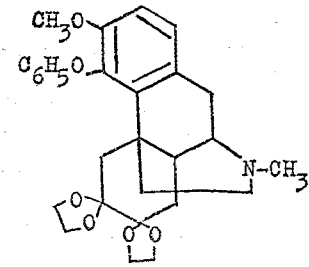

Deketalation ↓

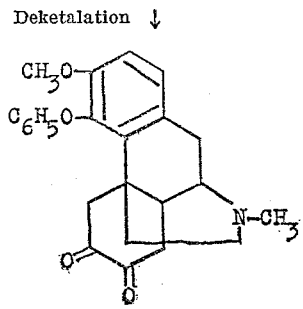

What is claimed is:

1. Process for preparing C-normorphinan derivatives which comprises reacting a compound represented by the plane formula:

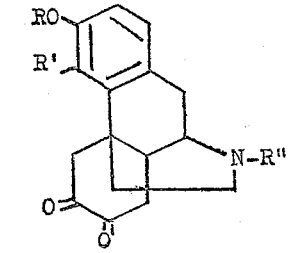

wherein R represents lower alkyl, R′ represents a member selected from the group consisting of hydrogen, phenyloxy and substituted phenyloxy wherein the substituent is a member selected from the group consisting of lower alkyl, lower alkoxy, nitro and amino and R″ represents a member selected from the group consisting of hydrogen, lower alkyl, benzyl and phenethyl with hydrogen peroxide in an inert organic solvent medium and reacting the thus-produced compound represented by the plane formula:

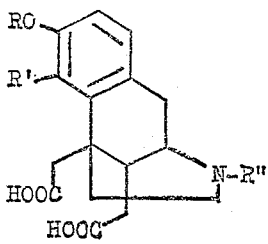

wherein R, R' and R" each has the same significance as designated above with lower alkanoic anhydride to produce the C-normorphinan represented by the plane formula:

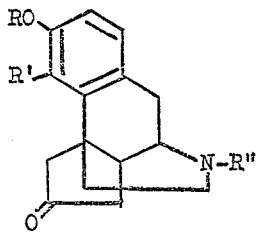

wherein R, R' and R" each has the same significance as designated above.

2. Process according to claim 1, wherein the oxidation is carried out while heating with reflux and the subsequent cyclization is also carried out while heating with reflux.

3. A compound represented by the plane formula:

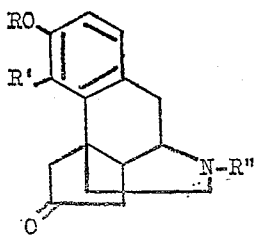

wherein R represents lower alkyl, R' represents a member selected from the group consisting of hydrogen, phenyloxy and substituted phenyloxy wherein the substituent is a member selected from the group consisting of lower alkyl, lower alkoxy, nitro and amino and R" represents a member selected from the group consisting of hydrogen, lower alkyl, benzyl and phenethyl.

4. 3-lower alkoxy-4-phenyloxy-6-oxo-N-lower alkyl-C-normorphinan.

5. (+)-3-methoxy-4-phenyloxy-6-oxo-N-methyl-C-normorphinan (cis).

6. (+)-3-methoxy-4-phenyloxy-6-oxo-N-methyl-C-normorphinan (cis) hydrochloride.

7. (−)-3-methoxy-4-phenyloxy-6-oxo-N-methyl-C-normorphinan (cis).

8. (−)-3-methoxy-4-phenyloxy-6-oxo-N-methyl-C-normorphinan (cis) hydrochloride.

9. 3-lower alkoxy-6-oxo-N-lower alkyl-C-normorphinan.

10. (+)-3-methoxy-6-oxo-N-methyl-C - normorphinan (cis).

11. (+)-3-methoxy-6-oxo-N-methyl-C - normorphinan (cis) hydrochloride.

12. (−)-3-methoxy-6-oxo-N-methyl-C - normorphinan (cis).

13. (−)-3-methoxy-6-oxo-N-methyl-C - normorphinan (cis) hydrochloride.

14. A compound represented by the plane formula:

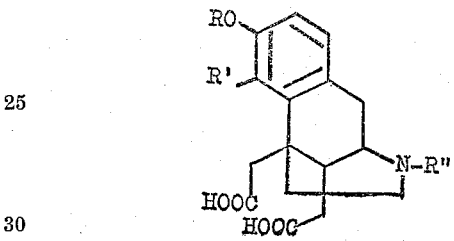

wherein R represents lower alkyl, R' represents a member selected from the group consisting of hydrogen, phenyloxy and substituted phenyloxy wherein the substituent is a member selected from the group consisting of lower alkyl, lower alkoxy, nitro and amino and R" represents a member selected from the group consisting of hydrogen, lower alkyl, benzyl and phenethyl.

15. 3-lower alkoxy-4-phenyloxy-N-lower alkyl-6,7-secomorphinan-6,7-dioic acid.

16. (−)-3-methoxy-4-phenyloxy-N-methyl-6,7 - secomorphinan-6,7-dioic acid (cis).

17. 3-lower alkoxy-N-lower alkyl-6,7-secomorphinan-6,7-dioic acid.

18. (+)-3-methoxy-N-methyl-6,7-secomorphinan - 6,7-dioic acid (cis).

19. (−)-3-methoxy-N-methyl-6,7-secomorphinan - 6,7-dioic acid (cis).

References Cited in the file of this patent

Hartung: Ind. and Eng. Chem., vol. 37, pp. 126–7 (1945).